United States Patent [19]

Hou et al.

[11] Patent Number: 5,515,139
[45] Date of Patent: May 7, 1996

[54] APPARATUS AND METHOD FOR LATERAL BELT CONTROL WITH BACKLASH COMPENSATION

[75] Inventors: Ssujan Hou; Daniel W. Costanza, both of Webster, N.Y.

[73] Assignee: Xerox Corporation, Stamford, Conn.

[21] Appl. No.: 297,084

[22] Filed: Aug. 29, 1994

[51] Int. Cl.$^6$ ............................ G03G 15/00; B65G 39/16
[52] U.S. Cl. .................... 355/208; 198/807; 242/534.1
[58] Field of Search ........................... 355/208, 212; 198/807, 810.03; 242/548, 563.1, 534.1

[56] References Cited

U.S. PATENT DOCUMENTS

| | | | |
|---|---|---|---|
| 4,061,222 | 12/1977 | Rushing | 198/807 |
| 4,170,175 | 10/1979 | Conlon, Jr. | 101/1 |
| 4,174,171 | 11/1979 | Hamaker et al. | 355/3 |
| 4,344,693 | 8/1982 | Hamaker | 355/3 |
| 4,429,985 | 2/1984 | Yokata | 355/3 |
| 4,572,417 | 2/1986 | Joseph et al. | 226/20 |
| 4,959,040 | 9/1990 | Gardner et al. | 198/807 |
| 4,961,089 | 10/1990 | Jamzadeh | 355/207 |
| 5,078,263 | 1/1992 | Thompson et al. | 198/807 |
| 5,225,877 | 7/1993 | Wong | 355/212 |
| 5,248,027 | 9/1993 | Kluger et al. | 198/807 |

*Primary Examiner*—Joan H. Pendegrass
*Assistant Examiner*—Sophia S. Chen
*Attorney, Agent, or Firm*—Kevin R. Kepner

[57] ABSTRACT

An apparatus and method for controlling lateral movement of a belt supported on two or more rollers in an electrophotographic printing machine. The belt is rotated for several revolutions and the actual profile of the belt edge is sensed and stored. A steering roll is then tilted at an angle large enough to overcome any steering system backlash and the belt drift rate is measured. Incremental steering adjustments are then made in the opposite direction until the belt drift rate reverses direction. The steering system backlash is then determined as a function of the incremental angle (which is a known number of steering motor steps) and the number of corrective steering changes made. The backlash for the system in the opposite direction is then determined in the same manner. Steering corrections to the belt are then made with compensation for backlash so that the steering system is more responsive.

20 Claims, 3 Drawing Sheets

APPARATUS AND METHOD FOR LATERAL BELT CONTROL WITH BACKLASH COMPENSATION

This invention relates generally to an electrophotographic printing machine, and more particularly concerns an improved method and apparatus for controlling the lateral movement of a moving belt.

In a typical electrophotographic printing process, a photoconductive member is charged to a substantially uniform potential so as to sensitize the surface thereof. The charged portion of the photoconductive member is exposed to a light image to selectively dissipate the charges thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering electrostatically to carrier granules. The toner particles are attracted from the carrier granules to the latent image forming a toner powder image on the photoconductive member. The toner powder image is then transferred from the photoconductive member to a copy sheet by "tack" transfer: i.e., the copy sheet is attached to the photoreceptor with a sufficiently high force to overcome external forces that might otherwise tend to cause slip. The toner particles are heated to permanently affix the powder image to the copy sheet.

The foregoing generally describes a typical black and white electrophotographic printing machine. With the advent of multicolor electrophotography, it is desirable to use the so-called tandem architecture which comprises a plurality of image forming stations. This tandem architecture offers potential for high throughput and image quality. One choice of photoreceptors in this tandem engine architecture is a drum based photoreceptor architecture used in combination with an intermediate transfer medium. Belt type photoreceptors can also be used in combination with either an intermediate transfer belt or an intermediate transfer drum.

Since the belt passes through many processing stations during the printing operation, lateral alignment thereof is critical and must be controlled within prescribed tolerances. As the belt passes through each of these processing stations, the location of the latent image must be precisely defined in order to optimize the operations relative to one another. If the position of the latent image deviates from processing station to processing station, copy quality may be significantly degraded. Hence, lateral movement of the photoreceptor belt must be minimized so that the belt moves in a predetermined path.

Similarly, document handling systems frequently employ belts to transport original documents to and from the exposure station. The lateral movement of belts used in document handling systems must also be controlled in order to insure the correct positioning of the original documents relative to the optical system of the exposure station.

There is a special need for precise control of lateral movement of a belt in a machine designed for multichromatic (color copy) image reproduction. In making multichromatic reproductions with an apparatus utilizing, for example, a moving charged photoreceptor belt, charge patterns corresponding to related color separation images may be formed in successive image frames of the belt. Such patterns are developed with pigmented marking particles to form transferable images. Each image is transferred sequentially to a respective receiver member whereby each image forms one of the several color separations for the multicolor reproduction. The sequential image transfer must be accomplished with high accuracy in order to obtain quality output of separations for faithful multicolor reproduction. In such color applications, transferable images generated from such successive "master" separations must be properly aligned for accurate superimposed registration during the creation of a multicolor composite print.

Therefore, during the production of such a separation, lateral movement of the belt during belt rotation must be closely controlled.

Ideally, if the photoreceptor and/or intermediate belt was perfectly constructed and entrained about perfectly cylindrical rollers mounted and secured in an exactly parallel relationship with one another, the velocity vector of the belt would be substantially normal to the longitudinal axis of the roller and there would be no lateral walking of the belt. However, in actual practice, this is not feasible. Frequently, the velocity vector of the belt approaches the longitudinal axis or axis of rotation of the roller at an angle. This produces lateral movement of the belt relative to the roller. Alternatively, the axis of rotation of the roller may be tilted relative to the velocity vector of the belt. Under these circumstances, the belt will also move laterally. Thus, the belt must be tracked or controlled to regulate its lateral position.

Numerous methods of controlling the lateral movement of the belt maintain the belt within desired parameters have been proposed and implemented. Certain of these control schemes use active belt steering which requires constant adjustment of the steering rolls which support the belt. Based on a belt position sensor feedback, the belt lateral movement is controlled through tilting of the steering roll with a predetermined gain factor. In a color printing application, this roll motion control needs to be precise to meet the belt lateral registration requirements. However, each copier can have a different steering backlash due to the tolerances in electronics hysteresis, roll tilting mechanism, alignment of rolls and frame, deformation and bending of the roll, etc. Such a backlash compromises the responsiveness of the control system and produces a belt limit cycle of varying amplitude. The registration result may not be acceptable when this amplitude is excessive. Accordingly it is desirable to have a combined system backlash that is compensated for when roll tilting is reversed. It is further desirable to be able to determine the steering rate for each individual machine and the accompanying system, in both steering directions for each individual machine, and to compensate for changes in the steering rate and system backlash.

The following disclosures may be relevant to various aspects of the present invention:

U.S. Pat. No. 4,061,222 Inventor: Rushing Issue Date: Dec. 6, 1977

U.S. Pat. No. 4,170,175 Inventor: Conlon, Jr. Issue date Oct. 9, 1979

U.S. Pat. No. 4,174,171 Inventor: Hamaker, et al Issue Date: Nov. 13, 1979

U.S. Pat. No. 4,344,693 Inventor: Hamaker Issue Date. Aug. 17, 1982

U.S. Pat. No. 4,429,985 Inventor: Yokota Issue Date: Feb. 7, 1984

U.S. Pat. No. 4,572,417 Inventor: Joseph, et al Issue Date: Feb. 25, 1986

U.S. Pat. No. 4,961,089 Inventor: Jamzadeh Issue Date: Oct. 2, 1990

U.S. Pat. No. 5,078,263 Inventor: Thompson, et al Issue Date: Jan. 7, 1992

U.S. Pat. No. 5,225,877 Inventor: Wong Issue Date: Jul. 6, 1993

The relevant portions of the foregoing disclosures may be briefly summarized as follows:

U.S. Pat. No. 4,061,222 to Rushing discloses an apparatus for tracking an endless belt along an endless path by a tiltable belt steering roller whose position is continually adjusted so that the belt is maintained at a stable equilibrium position despite changes in the belt shape. The adjustment is determined by control circuitry which produces signals representative of lateral belt edge position, a desired belt edge position, and either a steering roller position or an instantaneous lateral belt deviation rate to produce a control signal which is applied to a gear motor to control the tilt angle of the steering belt roller. This apparatus utilizes the absolute control method.

U.S. Pat. No. 4,170,175 to Conlon, Jr. discloses a system for tracking an endless belt which automatically compensates for creep of the belt. The belt is supported by four rollers. A first is a drive roller, a second and third are idler rollers, and a fourth roller is an idler roller with flared ends. The flared roller provides passive tracking without electronic or active feedback. One of the idler rollers is spring loaded such that when an edge of the belt creeps up on one of the flared ends of the fourth roller, that side of the spring loaded roller is caused to tilt due to increased belt stiffness on that side. This positions the belt laterally toward a central position.

U.S. Pat. No. 4,174,171 to Hamaker et ano discloses an apparatus for controlling the lateral alignment of a moving photoconductive belt. A resilient support constrains lateral movement of the belt causing a moment to be applied to a pivotably mounted steering post. As a result, the steering post pivots in a direction to restore the belt along a predetermined path. This apparatus is passive and provides no active electronic feedback.

U.S. Pat. No. 4,344,693 to Hamaker discloses an apparatus for controlling the lateral alignment of a moving photoconductive belt. Lateral movement of the belt causes a frictional force to be applied to the belt support. The frictional force tilts the belt support to restore the belt to the predetermined path of movement. This apparatus is passive and provides no active electronic feedback.

U.S. Pat. No. 4,429,985 to Yokota describes a recording system including a recording member in the form of an endless belt in which deviation of the position of the belt is sensed and a deviation correcting means in cooperation with a correcting circuit is used to correct the position of the member.

U.S. Pat. No. 4,572,417 to Joseph et al. discloses an apparatus for controlling lateral, cross track alignment of a web moving along a path to minimize lateral deviation between successive discrete areas of the web. A steering roller supports the web for movement along the path and is rotatable about an axis perpendicular to a plane of the span of the web approaching the steering roller.

U.S. Pat. No. 4,961,089 to Jamzadeh discloses a method and apparatus for controlling lateral movement of a web along an endless path. The lateral position of the web is monitored and a determination is made by a control unit if the web is within predetermined limits such that a copying operation can be completed while the web is still properly tracking. If the web is not tracking properly, or if it is predicted that the web will track beyond its predetermined lateral limits within a copying operation, a correcting step is taken prior to the copying operation. The correcting step determines a tilt angle for a steering roller. Upon completion of the correcting step, the apparatus returns to a monitoring capacity and does not provide corrective measures until the web is beyond or is predicted to go beyond the predetermined limits during a subsequent copying operation. This insures that copying operations have proper registration and do not include corrective steps during the copying operation which might interfere with the registration. This apparatus uses an absolute scheme to determine corrective action.

U.S. Pat. No. 5,078,263 to Thompson et al. discloses an active steering method that introduces corrective skew through a small rotation about the "soft-axis" of one or more idler rolls. The skew is introduced by an external connection to a servo-motor to alter the angle at which the web enters or leaves the roll to cause the web to walk along the roll.

U.S. Pat. No. 5,225,877 to Wong describes a belt steering control in which a steering roll is held at a negative steering position and a positive steering position for varying time intervals to maintain proper belt tracking based upon an analysis of the belt location.

In accordance with one aspect of the present invention, there is provided an apparatus for controlling a web moving along a predetermined path. The apparatus includes a web steering roll for supporting said web, said web steering roll being adapted for rotational movement about a longitudinal axis and tilting movement about a second axis transverse to the longitudinal axis and means, responsive to movement of the web in a direction substantially normal to the predetermined path, for tilting said steering roll about the second axis, to return the web to the predetermined path. Means for compensating for backlash in said tilting means so that oscillation of the web about the predetermined path is minimized is also provided.

Pursuant to another aspect of the present invention, there is provided a method for detecting and correcting steering system backlash of an moving web about a predetermined path. The method comprises the steps of:

a.) tilting a steering roll by an angle $\Theta_i$ about a steering axis in a first direction so that the web moves in a second direction;

b.) tilting the steering roll by an angle $\theta_1$ about the steering axis in a direction opposite to the first direction, wherein $\theta_1$ is a fraction of $\Theta_1$;

c.) repeating step b until the web moves in the direction opposite the second direction; and d.) determining backlash about the steering axis in the first direction as a function of angle $\theta_1$ and the number of times step c is repeated.

Pursuant to yet another aspect of the present invention, there is provided an electrophotographic printing machine of the type having an endless belt arranged to move along a path in a predetermined direction. The printing machine includes a belt steering roll for supporting said belt, said belt steering roll being adapted for rotational movement about a longitudinal axis and tilting movement about a second axis transverse to the longitudinal axis and means, responsive to movement of the belt in a direction substantially normal to the predetermined path, for tilting said steering roll about the second axis, to return the belt to the predetermined path. Means for compensating for backlash in said tilting means so that oscillation of the belt about the predetermined path is minimized is also provided.

Other features of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 4:
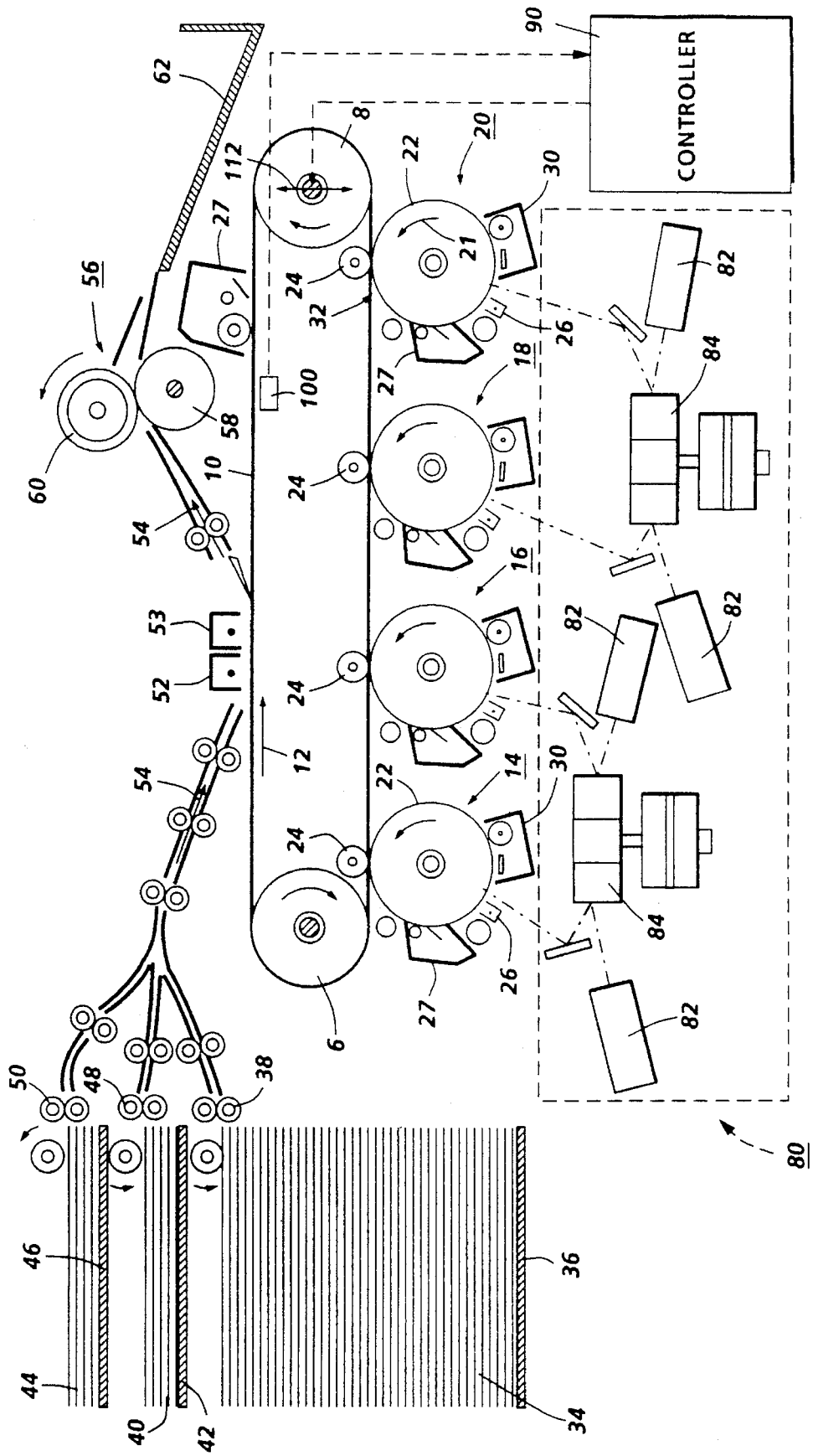
FIG. 4 is a schematic elevational view depicting an illustrative multicolor electrophotographic printing machine incorporating the apparatus of the present invention.

For a general understanding of the features of the present invention references are made to the drawings. In the drawings, like reference numerals have been used throughout to designate identical elements. Referring now to FIG. 4, an intermediate belt designated generally by the reference numeral 10 is mounted rotatably on the machine frame. Belt 10 rotates in the direction of arrow 12. Four imaging reproducing stations indicated generally by the reference numerals 14, 16, 18 and 20 are positioned about the periphery of the belt 10. Each image reproducing station is substantially identical to one another. The only distinctions between the image reproducing stations is their position and the color of the developer material employed therein. For example, image reproducing station 14 uses a black developer material, while stations 16, 18 and 20 use yellow, magenta and cyan colored developer material. Inasmuch as stations 14, 16, 18 and 20 are similar, only station 20 will be described in detail.

At station 20, a drum 22 having a photoconductive surface deposited on a conductive substrate rotates in direction of arrow 24. Preferably, the photoconductive surface is made from a selenium alloy with the conductive substrate being made from an electronically grounded aluminum alloy. Other suitable photoconductive surfaces and conductive substrates may also be employed. Drum 22 rotates in the direction of arrow 21 to advance successive portions of the photoconductive surface through the various processing stations disposed about the path of movement thereof.

Initially, a portion of the photoconductive surface of drum 22 passes beneath a corona generating device 26. Corona generating device 26 charges the photoconductive surface of the drum 22 to a relatively high, substantially uniform potential.

Next, the charged portion of the photoconductive surface is advanced through the imaging station. At the imaging station, an imaging unit indicated generally by the reference numeral 80, records an electrostatic latent image on the photoconductive surface of the drum 22. Imaging unit 80 includes a raster output scanner. The raster output scanner lays out the electrostatic latent image in a series of horizontal scan lines with each line having a specified number of pixels per inch. Preferably, the raster output scanner employs a laser 82 which generates a modulated beam of light rays which are scanned across the drum 22 by rotating a polygon mirror 84. Alternatively, the raster output scanner may use light emitting diode array write bars. In this way, an electrostatic latent image is recorded on the photoconductive surface of the drum 22.

Next, a developer unit indicated generally by the reference numeral 30 develops the electrostatic latent image with a cyan colored developer material. Image reproducing stations 14, 16 and 18 use black, yellow and magenta colored developer materials respectively. The latent image attracts toner particles from the carrier granules of the developer material to form a toner powder image on the photoconductive surface of drum 22. After development of the latent image with cyan toner, drum 22 continues to move in direction of arrow 21 to advance the cyan toner image to a transfer zone 32 where the cyan toner image is transferred from drum 22 to intermediate belt 10 by an intermediate transfer device such as a biased transfer roll 24.

At transfer zone 32, the developed powder image is transferred from photoconductive drum 22 to intermediate belt 10. Belt 10 and drum 22 have substantially the same tangential velocity in the transfer zone 32. Belt 10 is electrically biased to a potential of sufficient magnitude and polarity by biased transfer roll 24 to attract the developed powder image thereto from drum 22. Preferably, belt 10 is made from a conductive substrate with an appropriate dielectric coating such as a metallized polyester film.

After the cyan toner image is transferred to the belt 10 at reproducing station 20, belt 10 advances the cyan toner image to the transfer zone of reproducing station 18 where a magenta toner image is transferred to belt 10, in superimposed registration with the cyan toner image previously transferred to belt 10. After the magenta toner image is transferred to belt 10, belt 10 advances the transferred toner images to reproducing station 16 where the yellow toner image is transferred to belt 10 in superimposed registration with the previously transferred toner images. Finally, belt 10 advances the transferred toner images to reproducing station 14 where the black toner image is transferred thereto in superimposed registration with the previously transferred toner images. After all of the toner images have been transferred to belt 10 in superimposed registration with one another to form a multicolor toner image, the multicolor toner image is transferred to a sheet of support material, e.g., a copy paper at the transfer station.

At the transfer station, a copy sheet is moved into contact with the multicolor toner image on belt 10. The copy sheet is advanced to transfer station from a stack of sheets 34 mounted on a tray 36 by a sheet feeder 38 or from either a stack of sheets 40 on tray 42 or a stack of sheets 44 on a tray 46 by either sheet feeder 48 or sheet feeder 50. The copy sheet is advanced into contact with the multicolor image on belt 10 beneath corona generating unit 52 at the transfer station. Corona generating unit 52 sprays ions on to the back side of the sheet to attract the multicolor image to the front side thereof from belt 10. After transfer, the copy sheet passes under a second corona generating unit 53 for detack and continues to move in the direction of arrow 54 to a fusing station. The fusing station includes a fuser assembly generally indicated by the reference numeral 56, which permanently affixes the transferred toner image to the copy sheet. Preferably, fuser assembly 56 includes a heated fuser roll 58 and a backup roller 60 with the toner image on the copy sheet contacting fuser roller 58. In this manner, the toner image is permanently affixed to the copy sheet. After fusing, the copy sheets are then fed either to an output tray 62 or to a finishing station, which may include a stapler or binding mechanism.

Referring once again to reproducing station 20, invariably, after the toner image is transferred from drum 22 to belt 10, some residual particles remain adhering thereto. These residual particles are removed from the drum surface 22 at the cleaning station 27. Cleaning station includes a rotatably mounted fibrous or electrostatic brush in contact with the photoconductive surface of drum 22. The particles are cleaned from the drum 22 by rotation of the brush in contact therewith.

Belt 10 is cleaned in a like manner after transfer of the multicolor image to the copy sheet. Subsequent to cleaning, a discharge lamp (not shown) floods the photoconductive surface of drum 22 to dissipate any residual electrostatic charge remaining thereon prior to the charging thereof for the next successive imaging cycle.

It is believed that the foregoing description is sufficient for the purposes of the present application to illustrate the general operation of a tandem printing machine.

Figure 1:
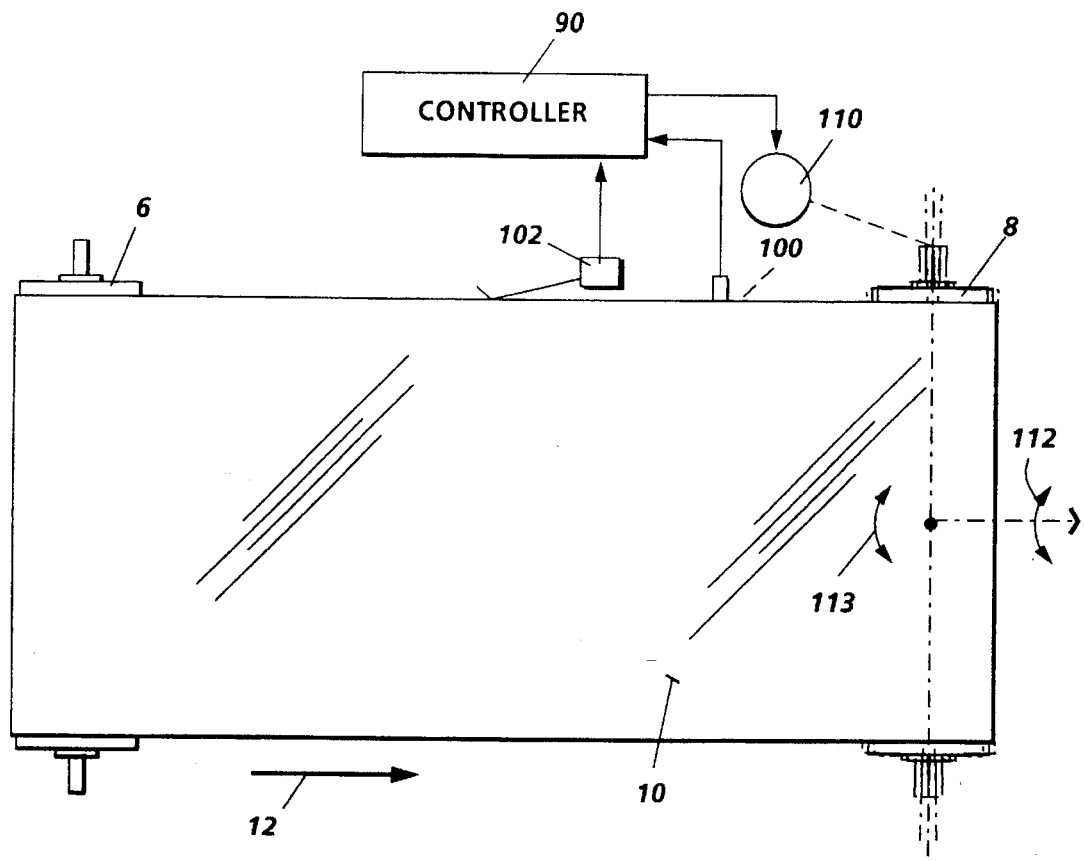
FIG. 1 is a schematic plan view of a belt utilizing the steering system apparatus of the present invention.

Turning now to FIG. 1, there is illustrated a schematic plan view of the intermediate belt 10 supported by a drive roll 6 and a steering idler roll 8, and also illustrating two alternative edge detectors 100, 102 to monitor the position of the edge of the belt. The detector may be an array of LED sensors 100 which sense the edge of the belt 10 and generate a signal indicative of the position of the edge of the belt 10 as it rotates around the support rollers 6, 8, or optical sensors may be used to read a pattern on the belt to determine the lateral position thereof. Alternatively, a mechanical position switch or reed switch 102 which rides along the edge of the belt 10 and generates a signal indicative of the edge position may be utilized to track the belt position.

The steering idler roll 8 is tilted about a soft or "steering" axis by a stepper motor 110 which causes the belt to laterally drift across the roller 8 in one direction or the other, depending upon the direction of tilt imparted about the soft axis by the stepper motor indicated by arrow 112. The arrow 113 represents the rotational movement of the hard axis of the steering roll which is adjusted to compensate for any conicity of the belt.

Figure 2:
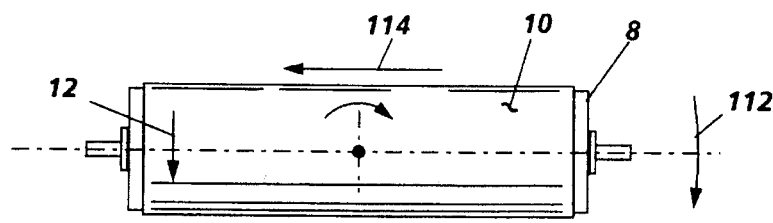
FIG. 2 is a schematic end elevational view of the belt steering roll of the present invention.

As illustrated in FIG. 2, when the steering roll 8 is tilted in a clockwise direction as indicated by arrow 112, while traveling in the direction of arrow 12, the tilting motion will cause the belt to walk or drift in the direction of arrow 114. Likewise, for a tilt in the counterclockwise direction, the belt will walk in the opposite direction. This tilting is what allows the belt to be steered to remain on the proper track for image registration.

The control system of the present invention determines the steering backlash for the steering roll in each direction which compromises the responsiveness of the control system and produces a belt limit cycle of varying amplitude. The steering system backlash must be determined for each direction so that the backlash may be compensated for when each steering movement is imparted by the stepper motor. For example, in one instance a steering step motor may need to overcome 20 steps before it actually turns the steering roll and in the opposite direction may need to overcome 45 steps before actual steering occurs. This backlash affects the belt drift rate which is defined as belt lateral displacement per belt revolution per N steering steps.

In order to properly maintain the required responsiveness of the steering system for each machine, a belt steering rate needs to be determined, a system backlash needs to be determined in each steering direction, and the control system must compensate for the above two factors as the system characteristics change with time. The present invention provides an automatic procedure which can easily determine the responsiveness of the system and compensate for changes in the responsiveness over time.

Figure 3:
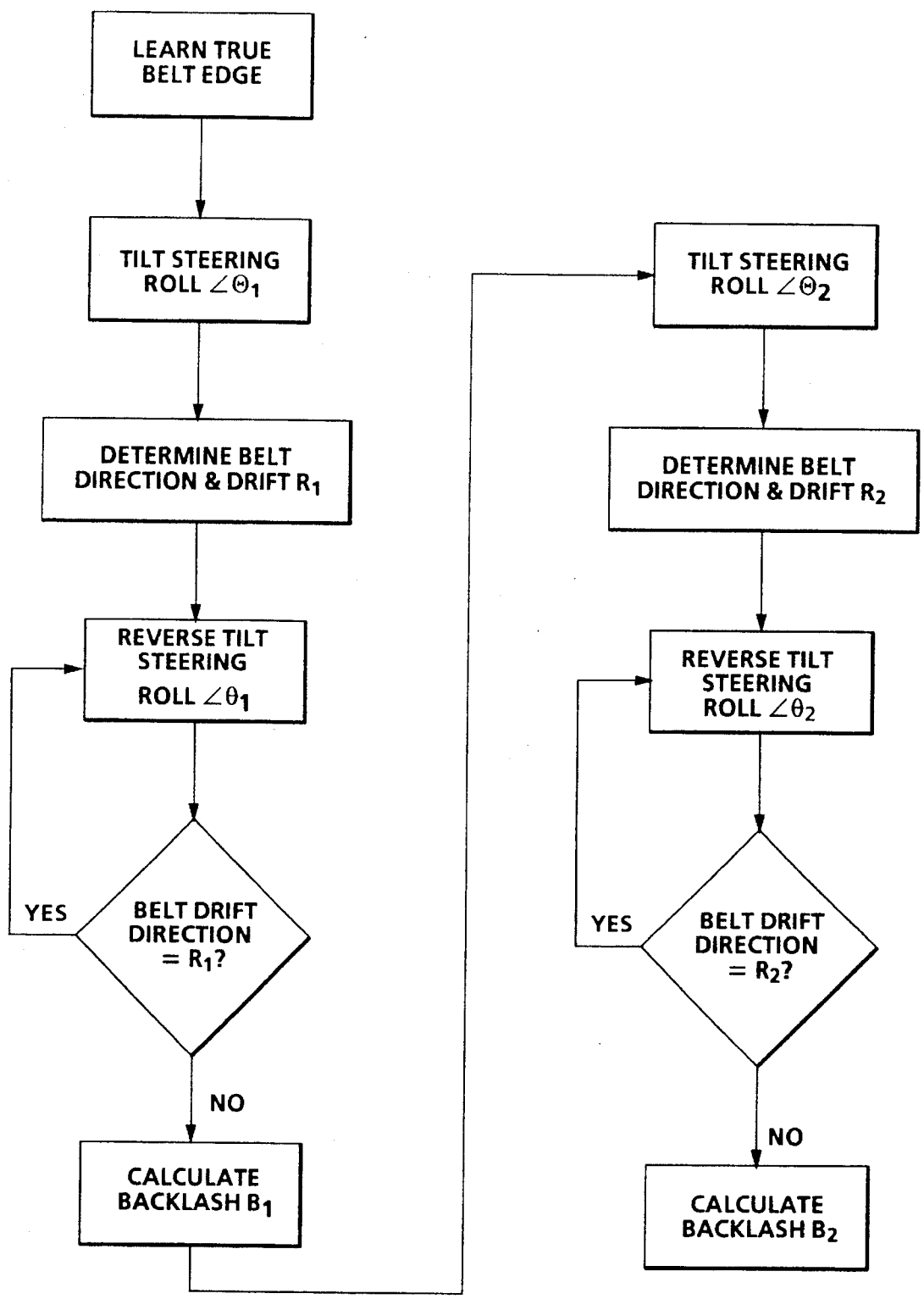
FIG. 3 is a flow diagram illustrating the method of the present invention to compensate for steering system backlash.

The procedure for performing the backlash compensation according to the present invention is illustrated in the FIG. 3 flow diagram as follows. First, the true belt edge is monitored and the position thereof learned according to one of several known methods. Once such method is described in U.S. patent application Ser. No. 08/006,347, Attorney Docket No. D/92062, filed Jan. 19, 1993, commonly assigned to the assignee herein, which disclosure is herein incorporated by reference.

Next, a maximum steering actuator backlash is assumed in terms of N (e.g. 50) steering steps, which is the worst condition to be expected. The steering roll is tilted to one side at an angle $\Theta_1$ (corresponding to N steering motor steps) to remove any backlash in that direction. The belt is then monitored for several belt revolutions to determine the belt drift direction and rate $R_1$. The roll is then tilted in the opposite direction of angle $\Theta_1$ at a smaller angle $\theta_1$ (corresponding to n steps, in which n is a fraction of N steps, e.g. 5) and the belt is monitored for several revolutions to determine the belt drift rate $r_1$. This step of tilting the roll in the opposite direction of $\Theta_1$ by the incremental angle $\theta_1$ is repeated until the belt drift changes direction. If it takes $M_1$ times to reverse the belt drift from inboard to outboard, it is then known that the backlash $B_1$ from the first direction to the second direction is $M_1$ X n steps. The entire procedure is then repeated in the opposite direction to determine the steering backlash $B_2$ in that direction also.

By using this procedure, the steering actuator backlash can be determined within a small range of error (n steps). By correcting this large backlash, the belt will have a minimum fluctuation about the set steering point. Accordingly, resultant overlaying images on the belt will be significantly improved and not compromised due to a large uncorrected backlash problem. Significant tracking improvement can be achieved when the backlash is compensated for in the steering control. Additionally, once the true edge is determined and learned, the belt drift rate can be determined in one revolution or in one sample time. Thus, if 50 steering corrections are made per belt revolution, one steering step can be made and the resulting belt drift measured at that time. Accordingly, the steering backlash in both directions can be determined in one belt revolution for each of the two steering directions. This allows an automatic tuneup to be performed whenever it is felt necessary due to degradation of registration in final copies. Additionally, the backlash and steering rate can be different in two directions due to failure to meet design specifications in equipment. The backlash is then individually compensated for in each direction to maintain proper registration. This system also allows the use of active steering to meet tight registration requirements by correcting the steering backlash inherent in every electromechanical system.

In recapitulation, there is provided an apparatus and method for controlling lateral movement of a belt supported on two or more rollers in an electrophotographic printing machine. The belt is rotated for several revolutions and the actual profile of the belt edge is sensed and stored. A steering roll is then tilted at an angle large enough to overcome any steering system backlash and the belt drift rate is measured. Incremental steering adjustments are then made in the opposite direction until the belt drift rate reverses direction. The steering system backlash is then determined as a function of the incremental angle (which is a known number of steering motor steps) and the number of corrective steering changes made. The backlash for the system in the opposite direction is then determined in the same manner. Steering corrections to the belt are then made with compensation for backlash so that the steering system is more responsive.

It is, therefore, apparent that there has been provided in accordance with the present invention, a belt steering system with backlash compensation that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An apparatus for controlling a web moving along a predetermined path, including:

a web steering roll for supporting said web, said web steering roll being adapted for rotational movement about a longitudinal axis and tilting movement about a second axis transverse to the longitudinal axis;

means, responsive to movement of the web in a direction substantially normal to the predetermined path, for tilting said steering roll about the second axis, to return the web to the predetermined path; and means for compensating for backlash in said tilting means so that oscillation of the web about the predetermined path is minimized, wherein said compensating means includes a device which performs the routine of tilting said steering roll in a first direction and then incrementally tilting said steering roll in a second direction, opposite the first direction, to determine a responsiveness of said tilting means.

2. An apparatus according to claim 1, comprising means for sensing movement of the web in a direction substantially normal to the predetermined path and generating a signal indicative thereof.

3. An apparatus according to claim 2, wherein said tilting means comprises:

a motor; and a linkage, connecting said motor with said steering roll to tilt said roll about the second axis through a selected angle.

4. An apparatus according to claim 3, wherein said compensating means comprises a programmable microprocessor adapted to process information relating to the position of said web relative to the tilt angle of the steering roll to compensate for backlash.

5. An apparatus according to claim 4 wherein said sensing means comprises a mechanical contact sensor contacting an edge of the web and generating a signal indicative of movement of the web in the direction normal to the predetermined path.

6. An apparatus according to claim 4, wherein said sensing means comprises an array of emitter receptor pairs located adjacent an edge of the web to generate a signal indicative of movement of the web in the direction normal to the predetermined path.

7. A method for detecting and correcting steering system backlash of an moving web about a predetermined path, comprising:

a.) tilting a steering roll by an angle $\Theta_1$ about a steering axis in a first direction so that the web moves in a second direction;

b.) tilting the steering roll by an angle $\theta_1$ about the steering axis in a direction opposite to the first direction, wherein $\theta_1$ is a fraction of $\Theta_1$;

c.) repeating step b until the web moves in the direction opposite the second direction; and d.) determining backlash about the steering axis in the first direction as a function of angle $\theta_1$ and the number of times step c is repeated.

8. A method according to claim 7, further comprising:

a.) tilting the steering roll by an angle $\Theta_2$ about the steering axis in the third direction opposite the first direction so that the web drifts in the direction opposite to the second direction;

b.) tilting the steering roll by an angle $\theta_2$ about the steering axis in the first direction, wherein $\theta_2$ is a fraction of $\Theta_2$;

c.) repeating step b until the web drifts in the second direction; and d.) determining the backlash about the steering axis in the second direction as a function of angle $\theta_2$ and the number of times step c is repeated.

9. A method according to claim 8, including correlating angles $\Theta_1$ and $\Theta_2$ to a number of steps $N_1$ and $N_2$ of a steering system stepper motor.

10. A method according to claim 9, including correlating angles $\theta_1$ and $\theta_2$ to a number of steps $n_1$ and $n_2$ of a steering system stepper motor wherein $n_1$ and $n_2$ are fractions of $N_1$ and $N_2$ respectively.

11. A method according to claim 10, including equating the number of times step b of claim 7 is repeated equals $m_1$.

12. A method according to claim 11, including equating the number of times step b of claim 8 is repeated equals $m_2$.

13. A method according to claim 11, including equating the backlash in the first direction to the formula $$B_1 = m_1(n_1) \text{steps.}$$

14. A method according to claim 12, including equating the backlash in the second direction to the formula $$B_2 = m_2(n_2) \text{steps.}$$

15. An electrophotographic printing machine of the type having an endless belt arranged to move along a path in a predetermined direction, including:

a belt steering roll for supporting said belt, said belt steering roll being adapted for rotational movement about a longitudinal axis and tilting movement about a second axis transverse to the longitudinal axis;

means, responsive to movement of the belt in a direction substantially normal to the predetermined path, for tilting said steering roll about the second axis, to return the belt to the predetermined path; and means for compensating for backlash in said tilting means so that oscillation of the belt about the predetermined path is minimized, wherein said compensating means includes a device which performs the routine of tilting said steering roll in a first direction and then incrementally tilting said steering roll in a second direction, opposite the first direction, to determine a responsiveness of said tilting means.

16. A printing machine according to claim 15, comprising means for sensing movement of the belt in a direction substantially normal to the predetermined path and generating a signal indicative thereof.

17. A printing machine according to claim 16, wherein said tilting means comprises:

a motor; and a linkage, connecting said motor with said steering roll to tilt said roll about the second axis through a selected angle.

18. A printing machine according to claim 17, wherein said compensating means comprises a programmable microprocessor adapted to process information relating to the position of said belt relative to the tilt angle of the steering roll to compensate for backlash.

19. A printing machine according to claim 18 wherein said sensing means comprises a mechanical contact sensor contacting an edge of the belt and generating a signal indicative of movement of the belt in the direction normal to the predetermined path.

20. A printing machine according to claim 18, wherein said sensing means comprises an array of emitter receptor pairs located adjacent an edge of the belt to generate a signal indicative of movement of the belt in the direction normal to the predetermined path.

* * * * *